(12) United States Patent
Dombrowski et al.

(10) Patent No.: US 8,907,005 B2
(45) Date of Patent: Dec. 9, 2014

(54) POWERFEED POLYMERS HAVING IMPROVED BLOCK RESISTANCE PERFORMANCE

(71) Applicant: Rohm and Haas Company, Philadelphia, PA (US)

(72) Inventors: Gary W. Dombrowski, West Chester, PA (US); Arnold S. Brownell, Lansdale, PA (US); Aurelia de la Cuesta Sheppard, Newtown, PA (US); Thomas R. Tepe, King of Prussia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 15 days.

(21) Appl. No.: 13/889,590

(22) Filed: May 8, 2013

(65) Prior Publication Data

US 2013/0303674 A1    Nov. 14, 2013

Related U.S. Application Data

(60) Provisional application No. 61/645,876, filed on May 11, 2012.

(51) Int. Cl.
*C08L 33/06* (2006.01)
*C08K 5/07* (2006.01)
*C09D 113/02* (2006.01)
*C08F 220/18* (2006.01)
*C09D 133/10* (2006.01)

(52) U.S. Cl.
CPC ............ *C09D 113/02* (2013.01); *C08F 220/18* (2013.01); *C09D 133/10* (2013.01)
USPC .......................................... 524/560; 524/359

(58) Field of Classification Search
CPC .................................................. C09D 113/02
USPC ............................................................ 524/560
See application file for complete search history.

(56) References Cited

U.S. PATENT DOCUMENTS

| 3,804,881 | A | | 4/1974 | Bassett et al. |
| 4,195,167 | A | | 3/1980 | Knopf et al. |
| 5,348,997 | A | * | 9/1994 | Kato et al. ..................... 524/189 |
| 5,756,573 | A | | 5/1998 | Trumbo et al. |
| 6,140,431 | A | | 10/2000 | Kinker et al. |
| 6,331,598 | B1 | | 12/2001 | Park et al. |
| 7,173,083 | B2 | | 2/2007 | Scheerder et al. |
| 2004/0077781 | A1 | * | 4/2004 | Murase et al. ................ 524/800 |

FOREIGN PATENT DOCUMENTS

| EP | 1371685 A2 | 12/2003 |
| EP | 2003152 A1 | 12/2008 |
| JP | 2000-319301 A | 11/2000 |

* cited by examiner

*Primary Examiner* — Hui Chin
(74) *Attorney, Agent, or Firm* — Andrew E. C. Merriam

(57) ABSTRACT

The present invention provides emulsion copolymers and coating compositions containing the same having improved room temperature and hot block resistance in coatings wherein the copolymers have a broad measured glass transition temperature and are the copolymerization product of a vinyl monomer composition A and a softer vinyl monomer composition B having a Hansch parameter of at least 3.2, and containing one or more vinyl monomer M, such that each of which vinyl monomer(s) M would when homopolymerized provide a homopolymer having a measured Tg of 20° C. or less, such as, for example, 2-ethylhexyl acrylate. In addition, the present invention provides methods for making the emulsion copolymers by a powerfeed process comprising feeding vinyl monomer composition A into a reactor from a feed vessel while feeding, simultaneously or after a delay, vinyl monomer composition B into the feed vessel while polymerizing the monomers in the reactor.

10 Claims, No Drawings

POWERFEED POLYMERS HAVING IMPROVED BLOCK RESISTANCE PERFORMANCE

The present invention relates to aqueous emulsion copolymers having improved block resistance and, in particular, to aqueous compositions comprising powerfeed aqueous emulsion copolymers having a broad measured glass transition temperature (measured Tg) which are the copolymerization product of monomers having a measured Tg of above 0° C. and monomers that are softer and more hydrophobic, as well as to methods of making the same.

Increasingly stringent policies and regulations for the protection of the environment have led to an increase in the demand for protective coatings having a low volatile organic content (VOC). Aqueous coating compositions having low VOCs also provide reduced odor and toxicity. However, previous low VOC polymers, such as soft-hard multistage polymers, polymer blends and soft film-forming polymers that do not need coalescents to make films, and coatings therefrom tend to provide paints having inferior hardness properties, poor blocking resistance, poor soil resistance, and surface tack.

Powerfeed methods for producing emulsion copolymers enable one to constantly vary the composition of monomers being polymerized. Such methods could be seen as a way to make copolymers having useful mixtures of properties. However, to date there remains a need to improve block resistance properties in paints and coatings formulated with acrylic polymers.

Japanese Patent Publication No. JP2000319301A, to Showa Highpolymer discloses power-feed polymers from a first ethylenically unsaturated compound (A) with a glass transition temperature of the polymer in the range of −30° C. or lower and a second ethylenically unsaturated compound (B) with a glass transition temperature of the polymer in the range of 30° C. or higher. The resulting polymer is intended to reduce tack on film surfaces at ordinary temperatures, thereby reducing adhesion of dirt and blocking. However, the resulting polymer has not been shown—to provide adequate blocking resistance or reduced tack in use.

The present inventors have sought to solve the problem of providing a powerfeed emulsion polymer and process for so making that achieves improved block resistance properties in use.

STATEMENT OF THE INVENTION

1. In accordance with the present invention, emulsion copolymer compositions having good block resistance in films made using the emulsion copolymer as a binder comprise vinyl emulsion copolymers, preferably acrylic emulsion copolymers, which have a broad measured glass transition temperature (measured Tg) and which are the copolymerization product residue of from 20 to 80 wt. %, preferably, 20 to 75 wt. %, based on the total weight of monomers used to make the copolymer, of vinyl monomer composition A containing one or more vinyl monomer A, and from 20 to 80 wt. %, preferably, 25 to 80 wt. %, based on the total weight of monomers used to make the copolymer, of vinyl monomer composition B having a Hansch parameter of at least 3.2, preferably, at least 3.4, and containing one or more vinyl monomer M, such that each of which vinyl monomer(s) M would when homopolymerized provide a homopolymer having a measured Tg of 20° C. or less, preferably, 0° C. or less, such as, for example, 2-ethylhexyl acrylate, 2-propylheptyl acrylate, or lauryl acrylate, wherein the total amount of vinyl monomer(s) M in vinyl monomer composition B is from 30 to 100 wt. % of the total amount vinyl monomer(s) M used in vinyl monomer compositions A and B, and, further wherein, vinyl monomer compositions A and B are selected such that a single-stage copolymer made from the total vinyl monomer composition used to make the emulsion copolymer would have a measured Tg of from 0 to 70° C., preferably, from 3° C. to 20° C.

2. In any of the compositions of item 1, above, the total vinyl monomer composition A, whether one monomer or a monomer mixture, has a measured Tg of 0° C. or more.

3. In any of the compositions of items 1 or 2, above, each vinyl monomer M preferably has a Hansch parameter of 3.0 or higher, or, preferably, 3.2 or higher.

4. In another aspect of the present invention, methods for making the emulsion copolymer comprise providing separately vinyl monomer composition A as defined in any of items 1, 2 or 3, above, in a primary feed vessel, and vinyl monomer composition B as defined in 1, above, in a secondary feed vessel, continuously introducing the contents of the primary feed vessel into a polymerization vessel and continuously feeding vinyl monomer composition B into the primary feed vessel while emulsion polymerizing the monomers in the polymerization vessel until vinyl monomer composition s A and B are polymerized.

5. In any of the methods of the present invention as set forth in 4, above, the feeding of vinyl monomer composition B into the primary feed vessel (and, thus, into vinyl monomer composition A) can start at the same time as feeding of vinyl monomer composition A into the polymerization vessel from the primary feed vessel, or can be delayed until after feeding of vinyl monomer composition A occurs for a certain period of time, such as from 5 min to 1 hour.

6. In another aspect, the present invention provides coating compositions containing the inventive emulsion copolymers of any of items 1, 2 or 3, above, and coatings made from such coating compositions. Such coating compositions have a volatile organics content (VOC) or 260 g/l or less, or 155 g/l or less, or, preferably, 105 g/l or less, or, more preferably, 60 g/l or less. Preferably, the coating compositions further comprise pigments, such as, for example, iron oxides, extenders, such as, for example, silica or calcium carbonate or clay, and/or opacifiers, such as, for example, titania or metal oxides having a refractive index of 1.7 or higher.

Unless otherwise indicated, conditions of temperature and pressure are room temperature and standard pressure.

All ranges recited are inclusive and combinable. For example, a disclosure of a Tg range of 0 to 70° C. and a preferred range of 20° C. or more includes a range of from 20 to 70° C. from 0 to 70° C. and from 0 to 20° C.

Unless otherwise indicated, any term containing parentheses refers, alternatively, to the whole term as if no parentheses were present and the term without them, and combinations of each alternative. Thus, the term "(meth)acrylic" refers to any of acrylic, methacrylic, and mixtures thereof.

As used herein, unless otherwise indicated, the term "copolymer" refers to polymers made from any two or more different monomers, e.g. terpolymers, pentapolymers & tc., and homopolymers functionalized after polymerization so that two or more different functional groups are present in the copolymer.

As used herein, the term "ethylenically unsaturated carboxylic acid monomer" refers to acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, β-styrylacrylic acid, maleic acid, itaconic acid, citraconic acid, cinnamic acid, and salts thereof.

As used herein, the term "calculated Tg" refers to the calculated glass transition temperature of homopolymers or (co)polymers, as determined using the Fox equation (T. G. Fox, *Bull. Am. Physics Soc.*, Volume 1, Issue No. 3, page 123 (1956)). For example, to calculate a Tg of a copolymer of monomers M1 and M2, $1/Tg=w(M1)/Tg(M1)+w(M2)/Tg(M2)$, wherein w(M1) is the weight fraction of monomer M1 in the copolymer, w(M2) is the weight fraction of monomer M2 in the copolymer, Tg(M1) is a published glass transition temperature ("Fox Tg") of a high molecular weight homopolymer (>50 k weight average) of M1, Tg(M2) is a published glass transition temperature of a high molecular weight homopolymer of M2, and all temperatures are in ° K. Suitable published glass transition temperatures are available at, for example, http://www.sigmaaldrich.com/img/assets/3900/Thermal_Transitions_of_Homopolymers.pdf.

As used herein, unless otherwise indicated, the phrase "measured glass transition temperature" or "measured Tg" of a copolymer refers to a measured Tg, determined by modulated differential scanning calorimetry (MDSC) scanning from −150° C. to 150° C. while ramping temperature in a given sinusoidal modulation (oscillation) pattern overlayed on a conventional linear heating ramp at a ramp rate of 2.00° C./min to 150.00° C., taking the mid-point in the heat flow versus temperature transition as the Tg value.

As used herein, the term "broad measured glass transition temperature (broad measured Tg)" refers to an MDSC glass transition wherein either the onset or final temperature of the recorded temperature curve are poorly defined such that no meaningful single measured Tg can be taken, and instead only a range of measured Tgs can be recorded. An example of a polymer having a broad measured Tg is a powerfeed emulsion copolymer.

As used herein, the term "Hansch parameter" for any molecule refers to parameters representing an index of polymer hydrophobicity, with higher values indicating greater hydrophobicity, as calculated according to the Kowwin methodology. A tool for this can be downloaded at http://www.epa.gov/oppt/exposure/pubs/episuitedl.htm. The Kowwin methodology uses a corrected "fragment constant" methodology to predict the Hansch parameter, expressed as log P. For any molecule, the molecular structure is divided into fragments each having a coefficient and all coefficient values in the structure are summed together to yield the log P estimate for the molecule. Fragments can be atoms but are larger functional groups (e.g. C=O) if the groups give a reproducible coefficient. The coefficients for each individual fragment were derived by multiple regression of reliably measured log P values (KOWWIN's "reductionist" fragment constant methodology), wherein the log P is measured by testing the fragment in a mixture of water and a given hydrophobic organic solvent. In the corrected fragment constant methodology, the coefficients of groups are adjusted by a correction factor to account for any differences between a measured log P coefficient value of a group and a log P for the same group that would result from summing the estimated log P coefficients from all atoms in the group alone. The KOWWIN calculation tool and estimation methodology were developed at Syracuse Research Corporation. A journal article by Meylan and Howard (1995) describes the program methodology as the "Atom/fragment contribution method for estimating octanol-water partition coefficients." *J. Pharm. Sci.* 1995, 84, 83-92. Hansch parameters can be calculated from coefficient values found at the website listed. Hansch parameters for common vinyl monomers are available from "Exploring QSAR: Volume 2: Hydrophobic, Electronic and Steric Constants, 1995, American Chemical Society, Washington, D.C.

As used herein, the term "Hansch parameter" for a vinyl monomer composition or mixture of more than one monomer refers to the weighted average by mole % of the Hansch parameter of each monomer in the composition. For example, to calculate the Hansch parameter of a mixture of 50 mole % styrene and 50 mole % 2-ethylhexyl acrylate, one would multiply the Hansch parameter of each monomer by its mole fraction (50 mole % equates to a 0.5 mole fraction) and take their sum as the Hansch parameter of the vinyl monomer composition: $2.89(0.5)+4.6(0.5)=3.75$.

As used herein, the term "(meth)acrylate" means acrylate, methacrylate, and mixtures thereof and the term "(meth)acrylic" used herein means acrylic, methacrylic, and mixtures thereof.

As used herein, the term "vinyl monomer composition" may comprise a single monomer, a neat mixture of the monomers or an aqueous monomer emulsion containing the one or more monomers.

As used herein, the phrase "wet emulsion copolymer" refers to the entire emulsion copolymer composition, including polymer, water, and any other materials included in the formation of the emulsion copolymer.

As used herein, the phrase "wt. %" stands for weight percent.

The present inventors have found that powerfeed polymers comprising certain soft, hydrophobic monomers, such as EHA provide much better block resistance properties than powerfeed polymers made from other soft monomers, such as BA. The compositional impact on block resistance was unexpected. Because such polymers are film forming using no or low levels of solvents or coalescents, the emulsion copolymers of the present invention enable the provision of low VOC coatings without tack and block resistance issues.

The emulsion copolymers of the present invention are formed by a powerfeed process which is one way to form copolymers having a broad measured glass transition temperature. Such emulsion copolymers are produced from polymerization of specific vinyl monomer compositions A and B, wherein the vinyl monomer composition B is fed into vinyl monomer composition A while vinyl monomer composition A composition is fed into the polymerization vessel. The copolymers of the present invention enable a surprisingly good block resistance performance for compositions that form films so easily without a large amount of solvent or coalescent. Accordingly, in a coating composition one can formulate paints with a lower amount of solvent or coalescent and achieve compositions with similar minimum film formation temperature (MFFT) or degree of film formation. Likewise, one can use a surprisingly broad range of monomers to formulate compositions that exhibit excellent film formation at use temperatures.

At least one of vinyl monomer composition A or B can be an acrylic monomer composition or a styrene acrylic monomer composition.

Vinyl monomer composition B is a soft, hydrophobic monomer composition which is prepared with one or more vinyl monomer M, or a mixture of vinyl monomers including vinyl monomer M, such that the total vinyl monomer composition B has a Hansch parameter of at least 3.2, preferably, at least 3.4. The percentage of vinyl monomer(s) M in vinyl monomer composition B is such that the vinyl monomer composition B contains 30 wt % to 100 wt % of the total vinyl monomer(s) M in the emulsion copolymer.

Vinyl monomer composition A is a harder, more hydrophilic composition than vinyl monomer composition B, as determined by comparing the—measured Tg of a single-stage copolymer made from the vinyl monomer composition A and that of one made from vinyl monomer composition B.

Suitable vinyl monomers for use in vinyl monomer composition A may include, in comparison to the vinyl monomers in vinyl monomer composition B, hard monomers, as determined by a measured Tg, more hydrophilic monomers, as determined by the Hansch parameter, than are vinyl monomers suitable for use in vinyl monomer composition B. Such monomers may include, in general, $C_1$ to $C_{12}$ alkyl(meth)acrylates that have a measured—Tg of greater than 0° C. or, preferably, 20° C. or higher, such as methyl methacrylate (MMA), ethyl methacrylate, 2-ethylhexyl methacrylate, cyclohexyl(meth)acrylate, isobornyl(meth)acrylate, benzyl (meth)acrylate, phenyl(meth)acrylate, 2-bromoethyl(meth) acrylate, 2-phenylethyl(meth)acrylate, and 1-naphthyl(meth) acrylate; styrene, vinyl toluene, vinyl naphthalene, α-methyl styrene, phosphorus acid-containing monomers, such as, for example, phosphoalkyl(meth)acrylates like phosphoethyl methacrylate (PEM), ethylenically unsaturated carboxylic acids, such as methacrylic acid (MAA), acrylic acid (AA), maleic acid and ethyl maleate; and multi-ethylenically unsaturated monomers having two or more unsaturation groups, such as, for example, acetylacetoxy ethylmethacrylate (AAEM) to promote adhesion to substrates. However, to insure that coatings and films made from the emulsion copolymer of the present invention have acceptable water resistance, the amount of ethylenically unsaturated carboxylic acids in the emulsion copolymer should not exceed 10 wt. %, based on the total weight of monomers used to make the emulsion copolymer, preferably, 5 wt. % or less. Further, the amount multi-ethylenically unsaturated monomers should be limited to 10 wt. %, based on the total weight of monomers used to make the emulsion copolymer, or, preferably 5 wt. % or less. In addition, vinyl monomer composition A may include in part vinyl monomer(s) M and/or other softer monomers useful in vinyl monomer composition B so long as no less than 30 wt. % of the vinyl monomer M used to make the copolymer is in vinyl monomer composition B and the measured Tg of a single stage copolymer made from the same vinyl monomer composition used to make the emulsion copolymer falls within the scope of the present invention.

Vinyl monomers M are any that have a Hansch parameter of at least 2.4, preferably, at least 3.0, or, more preferably, at least 3.2 and which would when homopolymerized provide homopolymers having a measured Tg of 20° C. or less, preferably, 0° C. or less. Such monomers may include, for example, 2-ethylhexyl acrylate (2-EHA), lauryl acrylate (LA), 2-propylheptyl acrylate, pentyl acrylate, Hexyl acrylate (HA), 2-methyl-butyl acrylate, 2-pentyl acrylate, (meth)acrylates of fatty alcohols, such as lauryl methacrylate (LMA), and vinyl versatate (Veo-Va).

Hansch parameters of vinyl monomers M and other vinyl monomers are listed in Table 1, below. Calculated Hansch parameters represent an index of polymer hydrophobicity, with higher values indicating greater hydrophobicity.

TABLE 1

Hansch Parameters and Tgs of Monomers M

| Monomer | Hansch Parameter | Homopolymer Tg |
|---|---|---|
| MAA | 0.99 | — |
| MMA | 1.28 | 105[1] |
| BA | 2.2 | −43° C.[1] |
| i-BA | 2.1 | −17° C.[1] |
| 2-methyl-butyl acrylate | 2.6 | Softer than BA[3] |

TABLE 1-continued

Hansch Parameters and Tgs of Monomers M

| Monomer | Hansch Parameter | Homopolymer Tg |
|---|---|---|
| 2-pentyl acrylate | 2.6 | Softer than BA[3] |
| Pentyl acrylate | 2.7 | Softer than BA[3] |
| HA = Hexyl acrylate | 3.2 | Softer than BA[3] |
| 2-EHA = 2-ethyl hexyl acrylate | 4.6 | −58° C.[1] |
| LA (Lauryl Acrylate) | 6.1 | Softer than BA[3] |
| LMA | 6.68 | Softer than BA[3] |
| VeoVa-10 | 4.14 | −3° C.[2] |
| STY | 2.89 | 107° C.[1] |

[1]Penzel, Rieger and Schneider; Polymer, Vol. 38 No. 2, pp. 325-337, 1997
[2]Momentive Product Bulletin for VeOVa Monomers, 2011, MSC 532 11/2011, and see http://www.momentive.com/home.aspx.
[3]Copolymer containing indicated monomer is softer (lower measured Tg) than copolymer containing the same amount of BA instead of the indicated monomer The emulsion copolymers of the present invention may be polymerized using conventional methods under conventional conditions. Reagents may include, for example, catalysts including initiators, like peracids or their salts, like persulfates, peroxides, or bis-nitriles; redox pairs, such as peroxides and (bi)sulfites. Likewise, conventional surfactants, such as anionic and nonionic surfactants or their mixtures can be used. As well, conventional chain transfer agents such as mercaptans may be used. Conventional feeding devices such as metering devices, feed vessels and reaction vessels may be used.

Additives may be included in the coating compositions of the present invention in conventional amounts. Suitable additives may include, for example, any or all of dispersants, surfactants, preferably nonionic or anionic, thickeners or rheology modifiers, antioxidants, such as, for example, benzophenone, in the amount of from 0.01 to 2.5 wt. %, preferably 0.6 wt. % or less, based on the total weight of the total wet emulsion copolymer, light stabilizers, and plasticizers or coalescents used in amounts that do not exceed the desired VOC limits of the compositions.

EXAMPLES

The following examples are used to illustrate the present invention. Unless otherwise indicated, all temperatures are room temperatures and all pressures are 1 atmosphere.

In the examples, the following test methods were used:

Modulated Differential Scanning Calorimetry (MDSC) Tg Measurement:

Emulsion copolymer samples were run on a TA Instruments Model Q2000 DSC (TA Instruments New Castle, Del.) calorimeter equipped with a liquid nitrogen cooling system scanning from −150° C. to 150° C. while ramping temperature in a sinusoidal modulation (oscillation) pattern overlayed on a conventional linear heating ramp. The atmosphere in the calorimeter was ultra pure helium. Samples were prepared in aluminum pans with lids that were hermetically sealed and the lids pinpricked to produce holes prior to reaction. Prior to the temperature ramp, the samples were held in a 70° C. atmosphere (in He) for 15 min. The temperature ramp parameters used were: Amplitude=+/−1.25° C.; Period=80 sec.; Ramp Rate=2° C./min. Temperature conditions are summarized as follows: 1: Pre-scanning ramp 20.00° C./min to 70.00° C.; 2: Hold isothermal for 15.00 min; 3: Equilibrate at −150.00° C.; 4: Modulate+/−1.25° C. every 80 seconds; 5: Hold isothermal for 5.00 min; 6: Ramp 2.00° C./min to 150.00° C. with modulation.

Paint Block Resistance (ASTM Method D4946):

Test paints were applied to a white Leneta chart (WB) (Leneta Company, Mahwah, N.J.) using a 76 μm (3 mil) Bird applicator (76 μm wet film thickness) and were allowed to dry for 1, 3, and 7 days or for the indicated time. Films were cast and allowed to dry in an Environmental Room were conditions set at 25° C./50% RH. The films were then tested and rated for block resistance in accordance with ASTM D4946-89 (ASTM International, West Conshohocken, Pa., 2008) As described below. Testing was done in triplicate (from same film panel) and the average was recorded.

Room Temperature Block Test:

Test Temperature of 25° C. (77° F.), 1.0 Kg weights, with weight duration times of any of 24 hrs, 48 hrs, 72 hrs, 96 hrs. Weights were applied after the coatings were let dry for the indicated time.

Hot Block Test:

Test temperature of 50° C., 1.0 Kg weights with 0.5 hr weight duration time. Weights were applied after the coatings were let dry for the indicated time.

Ratings:

From 1 to 10, with 4 or more being acceptable:

10: no tack, perfect; 9: trace tack, excellent; 8 slight tack, very good;

7: slight tack, good; 6: moderate tack, good; 5: moderate tack, fair;

4: severe tack, no seal, fair; 3: 5-25% seal, poor; 2: 25-50% seal, poor

1: 50-75% seal, poor; 0: complete seal, very poor.

The following Abbreviations were used:

BA: n-Butyl acrylate; EHA: 2-Ethylhexyl acrylate; MMA: Methyl methacrylate; MAA: Methacrylic acid; STY: Styrene; nDDM: n-Dodecylmercaptan; tBHP: t-Butylhydroperoxide, 70%; IAA: Isoascorbic Acid; APS: Ammonium persulfate; Surfactant A: DISPONIL™ FES-32 (Alkyl polyethoxysulfate, Na salt, Cognis Corp., Monheim, Del.).

MFFT: Minimum Film Formation Temperature (MFFT):

(for either a given copolymer or for a given formulated paint) Determined as described by T. F. Protzman and G. L. Brown in *J. Appl. Polymer Sci.* 4.81 (1960) using a planar aluminum slab on which a constant and uniform temperature gradient may be maintained. The coating composition to be measured is spread uniformly in one of several sample wells. The point at which the film becomes discontinuous when dry is observed and this temperature is recorded as the minimum film formation temperature (Visual MFFT). To insure that the films are actually continuous when formed above the MFFT, the films are scraped with a knife edge moving in the direction from low to high temperature. Below the MFFT the material chips off the bar easily but above the MFFT the coating does not lift off the bar. The transition between easily chipped to strong coating takes place at the Knife MFFT.

Synthesis Example 1

A monomer emulsion was prepared by mixing deionized water (488.6 g), Surfactant A (45.7 g), 2-EHA (430.8 g), MMA (512.8 g), STY (514.8 g), and MAA (72.4 g in a vessel. A reactor, equipped with overhead stirrer and thermocouple, was charged with deionized water (1090 g) and 6.9 g of Surfactant A, and then brought to 88° C. under a $N_2$ purge. The reactor was charged with solutions of APS (6.1 g in 60 mL deionized water), sodium carbonate (3.4 g in 35 g of deionized water, and 62.9 g of the monomer emulsion. The reactor was held at temperature for 10 minutes. A solution of APS (3.3 g in 78.7 g of deionized water) was then fed over 140 minutes, and the monomer emulsion vinyl monomer composition A was fed to the reactor from a monomer vessel at a rate of 9.0 g/min for 20 min, and then increased to a rate of 19.58 g/min for an additional 120 min, maintaining a reactor temperature of 88° C. Forty minutes after beginning the monomer emulsion feeds, a vinyl monomer composition B consisting of 526.5 g of EHA (vinyl monomer M) was fed to the monomer vessel at a rate of 5.26 g/min for 100 minutes, followed by a 30 g deionized water rinse.

After completion of addition, the monomer emulsion line was rinsed with deionized water (50 g) and the reactor was held at 88° C. for 20 minutes. The mixture was then cooled to 80° C. and 50 g of deionized water were added. At 80 C, a mixture of a 0.15% aqueous solution of iron sulfate heptahydrate (17.1 g) and a 1.0% aqueous solution of EDTA (2.6 g) was added. Separate solutions of tBHP (2.0 g in 20.3 g deionized water) and IAA (1.4 g in 20.3 g of deionized water) were co-fed over 20 minutes. The reactor was then cooled to 65° C. Then, 10.3 g of MMA and 10 g of deionized water were added, and then separate solutions of tBHP (2.0 g in 20.3 g deionized water) and IAA (1.4 g in 20.3 g of deionized water) were co-fed over 20 minutes. The reactor was cooled to 40° C., and then a solution of 18.0 g of 29% ammonium hydroxide in 11.3 g of deionized water was added over 10 minutes. The contents of the reactor were then cooled to room temperature, and charged with Rocima BT2S (7.4 g in 16.3 g of deionized water). The latex was passed through 100 and 325 mesh screens, and characterized for solids, pH, particle size, $T_g$ and MFFT (Table 2, below).

Synthesis of Example 4

Comparative

Single-Stage Emulsion Copolymer:

A vinyl monomer composition A (monomer emulsion) was prepared by mixing deionized water (488.6 g), Surfactant A (45.7 g), 2-EHA (957.3 g), MMA (512.8 g), STY (514.8 g), and MAA (72.4 g) in a vessel. A reactor, equipped with overhead stirrer and thermocouple, was charged with deionized water (1090 g) and 6.9 g of Surfactant A, and then brought to 88° C. under a $N_2$ purge. The reactor was charged with solutions of APS (6.1 g in 60 mL deionized water), sodium carbonate (3.4 g in 35 g of deionized water, and 62.9 g of the monomer emulsion. The reactor was held at temperature for 10 minutes. A solution of APS (3.3 g in 78.7 g of deionized water) was then fed over 140 minutes to the reactor, and the monomer emulsion was fed to the reactor at a rate of 9.0 g/min for 20 min, and then increased to a rate of 19.57 g/min for an additional 120 min, maintaining a reactor temperature of 88° C.

After completion of addition, the monomer emulsion line was rinsed with deionized water (80 g) and the reactor was held at 88° C. for 20 minutes. The mixture was then cooled to 80 C and 50 g of deionized water were added. At 80 C, a mixture of a 0.15% aqueous solution of iron sulfate heptahydrate (17.1 g) and a 1.0% aqueous solution of EDTA (2.6 g) was added. Separate solutions of tBHP (2.0 g in 20.3 g deionized water) and IAA (1.4 g in 20.3 g of deionized water) were co-fed over 20 minutes. The reactor was then cooled to 65° C. Then, 10.3 g of MMA and 10 g of deionized water were added, and then separate solutions of tBHP (2.0 g in 20.3 g deionized water) and IAA (1.4 g in 20.3 g of deionized water) were co-fed over 20 minutes. The reactor was cooled to 40° C., and then a solution of 18.0 g of 29% ammonium hydroxide in 11.3 g of deionized water was added over 10 minutes. The contents of the reactor were then cooled to room temperature, and charged with the biocide Rocima™ BT2S (1,2-Benzisothiazolin-3-one at 19% av. in dipropylene glycol and water, 7.4 g in 16.3 g of deionized water, Dow Chemical, Midland, Mich.). The latex was passed through 100 and 325 mesh screens, and characterized for solids, pH, particle size, $T_g$ and MFFT (Table 2, below).

Shown in Table 2, below, Examples 2-3, 5, 6, 7-8 and 10 and 11 were prepared using an identical procedure as described for Example 1, above, with the compositional changes for the monomer emulsion and the monomer emulsion additive. Such emulsion copolymers are powerfeed copolymers. Example 9 was prepared using an identical single stage copolymerization method as described for Example 4, above, with the indicated vinyl monomer composition A for the monomer emulsion and the vinyl monomer composition B. In addition to Examples 1-11, below, a commercial control included Maincote™ HG-54D binder (Dow Chemical, Midland, Mich.) a commercial single-stage emulsion copolymer with a higher Tg and higher MFFTs than any emulsion copolymers in Examples 1-11 and formulated at higher VOCs in paints. HG-54D is a commercial single-stage acrylic emulsion copolymer composition having a Tg (DSC) of 40° C. and a minimum film forming temperature (MFFT) of 31° C.

TABLE 2

Emulsion Copolymer Examples

| Vinyl Mer A | 1 | 2* | 3* | 4* | 5* | 6* (pbw) | 7 | 8* | 9* | *10 | *11 |
|---|---|---|---|---|---|---|---|---|---|---|---|
| EHA | 430.8 | 0 | 0 | 957.3 | 0 | 0 | 430.8 | 0 | 957.3 | 234.9 | 0 |
| BA | 0 | 598.3 | 497.8 | 0 | 430.8 | 598.3 | 0 | 497.8 | 0 | 270.3 | 430.8 |
| MMA | 512.8 | 140.6 | 363.9 | 512.8 | 512.8 | 655.4 | 1027.6 | 878.7 | 1027.6 | 953.2 | 1027.6 |
| STY | 514.8 | 514.8 | 514.8 | 514.8 | 514.8 | 0 | 0 | 0 | 0 | 0 | 0 |
| MAA | 72.4 | 72.4 | 72.4 | 72.4 | 72.4 | 72.4 | 72.4 | 72.4 | 72.4 | 72.4 | 72.4 |
| Vinyl Mer comp B (pbw) | EHA 526.5 | BA 731.2 | BA 608.4 | N/A | BA 526.5 | BA 731.2 | EHA 526.5 | BA 608.4 | N/A | EHA 244.8; BA 281.7 | BA 526.5 |
| Additive feed rate g/min | 5.26 | 7.31 | 6.08 | N/A | 5.26 | 7.31 | 5.26 | 6.08 | N/A | 5.26 | 5.26 |
| pH | 7.9 | 8.0 | 8.2 | 7.9 | 8.2 | 8.0 | 7.9 | 8.5 | 8.1 | 8.2 | 8.5 |
| Solids | 49.7% | 49.6% | 49.7% | 49.7% | 49.7% | 49.7% | 49.7% | 49.6% | 49.7% | 49.5% | 49.6% |
| Particle Size (nm) | 99 | 102 | 104 | 104 | 106 | 109 | 108 | 120 | 117 | 111 | 115 |
| Measured Tg (° C.) | broad | broad | broad | 13.9 | broad | broad | broad | broad | 18 | broad | broad |
| MFFT (visual/knife) (° C.) | 24/24 | <5/<5 | 13/14 | 12/14 | 24/25 | <5/<5 | 31/32 | 9/13 | 16/18 | 10/16 | 17/20 |

*Comparative;
N/A: Not applicable.

Formulation of White Gloss Paints:

Paints with a 15 Pigment Volume Content (PVC), 37.43% volume solids, and containing the emulsion copolymers of Examples 1-11 were prepared according to the formulation given in Table 3, below, for Example 1 where the $TiO_2$ dispersions were prepared from dry $TiO_2$ pigment. VOC content of the Example 1 coating composition was 100 (95) g/L.

TABLE 3

Paint Formulations (15 PVC)

| Ingredient | Parts by Weight |
|---|---|
| TiO2 Dispersion | |
| Water | 32.18 |
| Tamol™ 681[1] | 4.85 |
| Aqua Ammonia (15%) | 6.51 |
| Foamaster™ AP[2] | 2.5 |
| TiPure™ R-706[3] | 93.73 |
| To $TiO_2$ dispersion above, the following premix was added with good mixing | |
| Premix | |
| Example 1 emulsion copolymer | 270.8 |
| Water | 59.1 |
| Foamaster™ AP[2] | 1.50 |
| After 5 minutes, added following with good mixing | |
| Dowanol™ DPM[8] | 8.3 |
| Texanol™,[4] | 6.3 |
| Surfynol™,[5] 104 DPM | 1.5 |
| Sodium Nitrite (15%) | 6.46 |
| Acrysol™,[6] RM2020NPR | 1.83 |
| Acrysol™,[6] RM825 | 0.99 |
| Total | 496.58 |

[1]Dispersant, 34-36% by weight of an acrylic copolymer, Dow Chemical, Midland MI;
[2]Defoamer, petroleum derivative (100% actives), BASF Corporation, Florham Park, NJ;
[3]Rutile titanium dioxide pigment, manufactured by the chloride process, Dupont De Nemours, Wilmington, DE;
[4]Coalescent 2,2,4-trimethyl-1,3-pentanediol mono(2-methylpropanoate), Eastman Company, Kingsport, TN;
[5]nonionic surfactant of 2,4,7,9-tetramethyl-5-decyne-4,7-diol, 50%, and methoxymethylethoxypropanol, 50% (as 50% active liquid in dipropylene glycol monomethyl ether), Air Products, Allentown, PA;
[6]Nonionic, hydrophobically modified ethylene oxide urethane (HEUR) rheology modifier (19-21% in water), Dow Chemical, Midland, MI;
[7]Nonionic urethane rheology modifier (24-26% with diethylene glycol monobutyl ether (19-21%) in water to 100%), Dow Chemical, Midland, MI;
[8]Dipropylene glycol methyl ether (mixed isomers), Dow Chemical, Midland, MI.

The measured Visual MFFT (minimum film formation temperature) of the formulated paint based on Example 1 was 5° C. For each paint formulated for Examples 2 to 11, the levels of the coalescent in the paint (DPM and Texanol) were adjusted so as to target the paint MFFT to be between 5 and 10° C. Table 3a below summarizes the Coalescent levels and VOCs for the paints formulated with the different polymers in Examples 1-11, as indicated. VOCs for formulated paints containing the copolymer of Examples 1-11 varied accordingly between 13 g/l and 100 g/l. The VOCs of the commercial control HG-54D was significantly higher at 186 g/l.

TABLE 3a

Levels of Coalescents and VOC in 15 PVC formulated Paints

| Example | Dowanol™ DPM[1] | Texanol[1] | VOCs (g/l) |
| --- | --- | --- | --- |
| 1 | 6.2 | 4.6 | 95 |
| 2 | 0 | 0 | 13 |
| 3 | 6.2 | 0 | 62 |
| 4 | 6.2 | 0 | 62 |
| 5 | 6.2 | 4.6 | 95 |
| 6 | 0 | 0 | 13 |
| 7 | 6.2 | 4.6 | 95 |
| 8 | 6.2 | 0 | 62 |
| 9 | 6.2 | 0 | 62 |
| 10 | 6.2 | 0 | 62 |
| 11 | 6.2 | 3.0 | 84 |
| HG-54D | 15 | 9.5 | 186 |

[1]% of coalescent based on solid copolymer

TABLE 4

Hot Block Resistance (50° C. oven, 1 Kg Weight, 0.5 hr duration)

| Example | 1 day Dry | 3 day dry | 7 day dry |
| --- | --- | --- | --- |
| 1 | 6.7 | 5.7 | 5.0 |
| 2 | 0 | 0 | — |
| 3 | 0 | 0 | 0 |
| 4 | 0 | 0 | 0 |
| 5 | 0 | 0 | 0 |
| 6 | 0 | 0 | — |
| 7 | 5.0 | 4.3 | — |
| 8 | 0 | 0 | — |
| 9 | 0 | 0 | — |
| 10 | 0 | 0 | 0 |
| 11 | 0 | 0 | — |
| HG-54D | 0 | 0 | 0 |

TABLE 5

1 Day Dry, Room Temperature Block
(15 PVC White Paints, 1 Kg Weight, 24 hr vs 48 hr vs 96 hr duration)

| Example | 24 hr | 48 hr | 96 hr |
| --- | --- | --- | --- |
| 1 | 6.7 | 5.7 | 6.0 |
| 2 | 0 | — | — |
| 3 | 2.7 | 1.0 | 0 |
| 4 | 1.0 | 0 | 0 |
| 5 | 4.0 | 2.3 | 0 |
| 6 | 0 | — | — |
| 7 | 8.0 | — | — |
| 8 | 3.7 | — | — |
| 9 | 1.7 | — | — |
| 10 | 0.7 | 0 | — |
| 11 | 0 | — | — |
| HG-54D | 6.7 | 4.3 | 4.0 |

As shown in Tables 4 and 5, above, the inventive powerfeed emulsion copolymers made from a vinyl monomer composition B having a Hansch parameter of above 3.2, including a vinyl monomer M having a preferred Hansch parameter above 3.2, gives superior block resistance both at room temperature and at a hot temperature. Treated as single stage copolymers, the emulsion copolymers of Examples 1 and 4 have the same calculated Tg because they are made from the same monomer composition. Thus, it is surprising that formulation containing the emulsion copolymer of Example 1 has superior block resistance versus that of comparative Example 4, a single stage copolymer having a measured Tg of 13.9° C. (contains a monomer M, EHA).

In all of the Examples, the formulations have roughly the same MFFT. Thus, it is surprising that the formulation of Example 1 gave superior block resistance versus:

That of comparative Example 3, a powerfeed emulsion copolymer that uses BA (too low a Hansch parameter for an M monomer) instead of EHA, especially as a single stage polymer having the same composition as Example 3 has a higher measured Tg (14.3° C.) than a single stage emulsion copolymer made from the monomer composition of Example 1; and, that of comparative Example 5, a powerfeed emulsion copolymer that uses BA instead of EHA even though a single stage polymer having the same composition as Example 5 has a higher measured Tg of 25.9° C.

Judging by the measured Tgs of the single stage copolymers in comparative Examples 3, 4 and 5, these would have been expected to have comparable or better block resistance than inventive Example 1. Likewise, in coating formulations, the emulsion copolymer of Example 7 has superior block resistance versus comparative Example 9, a single stage copolymer having a measured Tg of 18° C. and exactly the same composition as the emulsion copolymer of Example 7; versus comparative Example 8, a powerfeed emulsion copolymer that uses BA (not a M monomer) instead of EHA even though a single stage polymer having the same composition as Example 8 would have a similar measured Tg (13° C.) to that of Example 7; and versus comparative Example 11, a powerfeed that uses BA (not a M monomer) instead of EHA, even though a single stage polymer having the same composition as Example 11 had a higher measured Tg (26° C.) than that of Example 7.

We claim:

1. A composition comprising one or more emulsion copolymer which has a broad measured glass transition temperature (measured Tg) and which are the copolymerization product residue of from 20 to 80 wt. %, based on the total weight of monomers used to make the copolymer, of vinyl monomer composition A containing one or more vinyl monomer A, and from 20 to 80 wt. %, based on the total weight of monomers used to make the copolymer, of vinyl monomer composition B having a Hansch parameter of at least 3.2, and containing one or more vinyl monomer M, such that each of which vinyl monomer(s) M would when homopolymerized provide a homopolymer having a measured Tg of 20° C. or less, wherein the total amount of vinyl monomer(s) M in vinyl monomer composition B is from 30 to 100 wt. % of the total amount vinyl monomer(s) M used in vinyl monomer compositions A and B, and, further wherein, the vinyl monomer compositions A and B are selected such that a single-stage copolymer made from the total vinyl monomer composition used to make the emulsion copolymer would have a measured Tg of from 0 to 70° C.

2. The composition as claimed in claim 1, wherein the vinyl monomer composition A, has a measured Tg of 0° C. or more.

3. The composition as claimed in claim 1, wherein vinyl monomer M would when homopolymerized provide a homopolymer having a measured Tg of 0° C. or less.

4. The composition as claimed in claim 1, wherein vinyl monomer M is chosen from 2-ethylhexyl acrylate, 2-propylheptyl acrylate, and lauryl acrylate.

5. The composition as claimed in claim 1, the vinyl monomer compositions A and B are selected such that a single-stage copolymer made from the total vinyl monomer composition used to make the emulsion copolymer would have a measured Tg of from 3° C. to 20° C.

6. The composition as claimed in claim 1, wherein vinyl monomer composition A or vinyl composition B is acrylic or styrene acrylic.

7. A method for making the emulsion copolymer of claim 1 comprising providing separately vinyl monomer composition A in a primary feed vessel, and vinyl monomer composition B, including vinyl monomer M in a secondary feed vessel, continuously introducing the contents of the primary feed vessel into a polymerization vessel and continuously feeding vinyl monomer composition B into the primary feed vessel while emulsion polymerizing the monomers in the polymerization vessel until vinyl monomer compositions A and B are polymerized.

8. The composition as claimed in claim 1, which is a coating composition containing the emulsion copolymer and has a volatile organics content (VOC) of 155 g/l or less.

9. The composition as claimed in claim 8, wherein the VOC content is 105 g/l or less.

10. The composition as claimed in claim 1, further comprising benzophenone.

* * * * *